April 29, 1969 F. ULRICH 3,441,907

MAGNETIC TRANSLATOR

Filed July 2, 1965 Sheet 1 of 4

INVENTOR
FRIEDRICH ULRICH

BY [signature]
ATTORNEY

MAGNETIC TRANSLATOR

INVENTOR
FRIEDRICH ULRICH

BY

ATTORNEY

INVENTOR
FRIEDRICH ULRICH

BY

ATTORNEY

INVENTOR
FRIEDRICH ULRICH

BY

ATTORNEY

United States Patent Office 3,441,907
Patented Apr. 29, 1969

3,441,907
MAGNETIC TRANSLATOR

Friedrich Ulrich, Stuttgart-Bad Cannstatt, Germany, assignor to International Standard Electric Corporation Filed July 2, 1965, Ser. No. 469,270
Int. Cl. G11b *5/00;* H04q *1/00*
U.S. Cl. 340—166 11 Claims

ABSTRACT OF THE DISCLOSURE

Magnetic translator circuitry wherein a magnetic core is provided for each translation. The magnetic cores are selectively threaded by input control leads to form the input code. Similarly, output leads selectively thread the same cores to form the output code. Several groups of input and/or output leads are provided so that multiple translations can be accomplished simultaneously using one translator. To facilitate the use of the translator on one or more codes simultaneously each core is equipped with two additional windings which are used as blocking oscillators to increase the operative speed and the output power of the translator. In addition, short circuit windings are provided to minimize noise.

The present invention relates to electrical translators, in which one code combination can be translated into a different code combination and more particularly to such translators using magnetic cores as cross-point elements.

Translators of this sort can be used in telephone exchanges for making translations such as are needed to convert an exchange designation code as dialed by a caller (e.g. HOL, which corresponds to the digits 405, for Holborn Exchange) into the routing digits needed to route the call to the wanted exchange, or to convert a subscriber's directory number into the corresponding equipment number, or vice versa. Other uses exist for such translators, especially in the field of computations, where they can be used for conversion between different forms of digited rotation.

There are various magnetic core translator circuit arrangements known which use different control methods. However, in all of the arrangements the desired output signal is obtained by reversing the correlated core or cores. Depending on the code selected the cores have several output windings so that the output of a core can be distributed onto several output circuits. Those known arrangements are particularly disadvantageous when the output signal is emitted in parallel and produced only by the reversal of a magnetic core. One disadvantage is the relatively small amount of electrical output power furnished. Accordingly, it is an object of the invention to find a magnetic translator which can furnish more electric power at the output end and nevertheless requires only a small amount of control power at the input side.

Another object of the invention is to provide magnetic core translators operative through a wide range of control current variations and amendable to a wide variety of input codes.

According to one embodiment of the invention, a static magnetic translator is provided which includes a core of a ferro-magnetic material for each code for which a translation may be required. A set of input wires is provided over which a code to be translated is received in parallel fashion; each of the said input wires threads a selection of said cores. The combination of cores threaded by said wires is such that when a code to be translated is received over the input wires inhibiting conditions are applied to all cores except the core for that code. A set of output wires is provided, each of which threads a selection of the cores, the selection of output wires threading respective ones of said cores being dependent on the translations appropriate to the input codes corresponding to those cores. A read-out input is adapted to apply a read-out signal simultaneously to all of said wires. The input signal is translated over a maximum of two timing pulses by inducing onto said output wires a combination of signals characteristic of the translation corresponding to the input code for that core.

Embodiments of the invention will now be described with reference to the accompanying drawings, in which.

Figure 1:
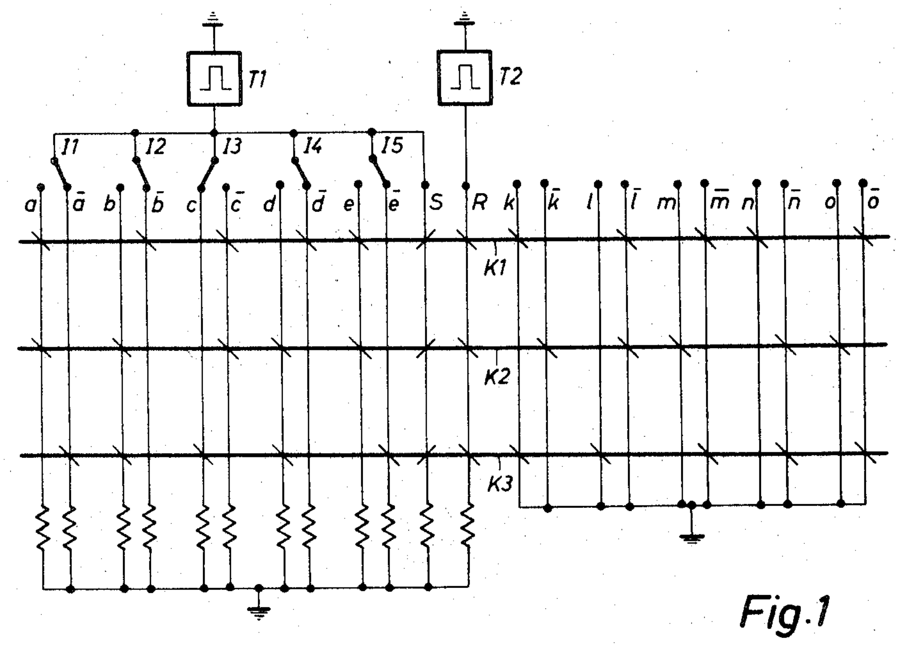
FIG. 1 is a translator in which a two-pulse operating cycle is used.

To simplify description the translator of FIG. 1 has only three cores, K1, K2 and K3, one for each code which may have to be translated, although a larger number could and usually would be provided. Each core, although most commonly a toroidal core, is shown as a heavy horizontal line. The input wires provide for a five-bit combination in which each bit is 1 or 0, and two input wires are provided for each bit. The wires for each bit are designated "true" or "complement," thus for the first bit we have $a$ or $\bar{a}$, and so on. The manner in which the wires are threaded through the cores is such that when a code is received the only core *not* threaded by an energized winding is that for the received code.

Thus when the code to be dealt with is $\bar{a}\,\bar{b}\,c\,\bar{d}\,\bar{e}$ (i.e. 00100) core K2 is selected as none of the wires for that code thread it. In a similar way core K1 is selected for $\bar{a}\,b\,c\,d\,\bar{e}$, and K3 is selected for $a\,\bar{b}\,\bar{c}\,\bar{d}\,e$. The selection of the input wires is shown as using mechanical contacts; in practice these would usually be electronic devices in all of the translators described herein.

On the right-hand side of the drawing there are five pairs of output wires $k$, $\bar{k}$ to $q$, $\bar{q}$ respectively (of which $p$, $\bar{p}$ and $q$, $\bar{q}$ are not shown) which thread the cores such that when a change in the magnetization condition of a core occurs pulses are induced in a combination of wires appropriate to that core's output code. Thus the output codes for these cores (omitting the $p$ and $q$ bits) are:

Core K1 . . . $k$, $\bar{l}$, $\bar{m}$, $n$, $\bar{o}$
K2 . . . $\bar{k}$, $\bar{l}$, $m$, $\bar{n}$, $o$
K3 . . . $k$, $l$, $\bar{m}$, $\bar{n}$, $\bar{o}$ There is also a two common winding S, R threading all cores.

When a wire threads a core a short diagonal line is drawn, intersecting that wire at the line which represents that core, the angle of the short line being indicative of the direction in which the wire threads the core. A wire threading a core is, of course, a single-turn winding on that core.

To translate a code, the translator is seized by means (not shown) and the code to be dealt with set up on the contacts shown in FIG. 1: it is assumed that the input code is $\bar{a}$, $\bar{b}$, $c$, $\bar{d}$, $\bar{e}$ (i.e. 00100). All cores K1, K2, K3 are rectangular loop cores. After the input code has been set up, a pulse T1 is applied to the input wires as shown and flows in one wire of each pair and also the S lead, thus reversing the magnetization state of only the core not threaded by at least one pulsed wire, that is core K2. These cores are all initially in a first state, referred to as 0, so only core K2 is now set to a second state, referred to as 1. (The size of the T1 pulse is such as to drive a core from 0 to 1 on its own.) The changeover of core K2 induces output pulses into the output wires corresponding to the translation for K2 which is $\bar{k}$, $\bar{l}$, $m$, $\bar{n}$ and $o$.

T1 is followed by a pulse T2 of similar polarity as seen by the cores, and this drives the only changed core, K2 in this case, back to its 0 state. Since the other cores are already in their 0 state, pulse T2 has no effect on them.

The input wires all have series resistors such as R1 to avoid excessive current flow, but no such resistors are needed for output wires. The interval between T1–T2 is as short as needed to allow proper core switching to occur and to allow transients to expire.

Figure 2:
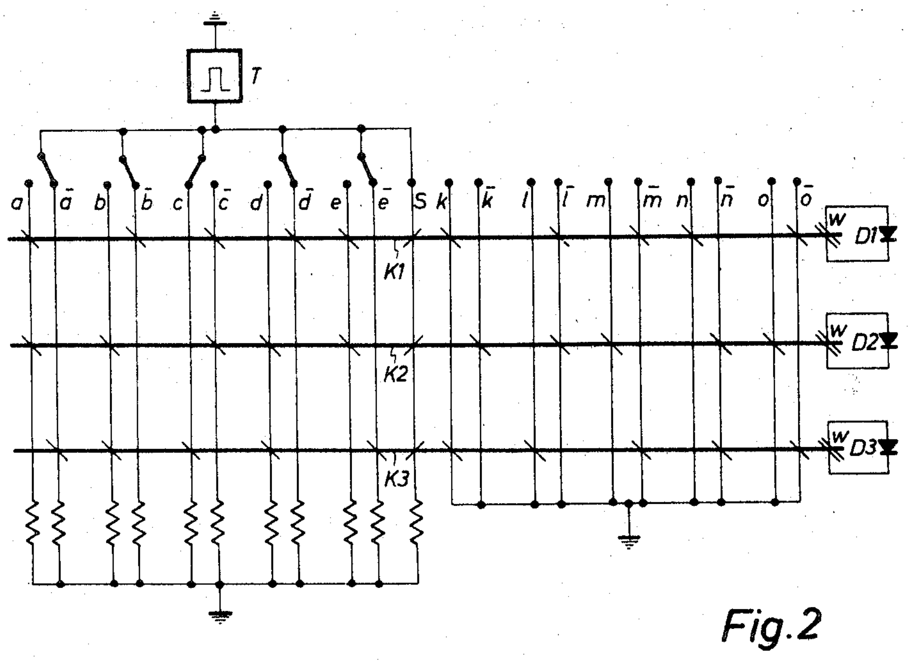
FIG. 2 is another translator but in which the operating cycle is shortened still further, to a single pulse.

In the arrangements fo FIG. 2, a single-pulse "cycle" is used, and the cores do not have square-loop characteristics. The arrangement is similar to FIG. 1 except that no reset pulse source and wire is needed. When a translation is needed, a pulse T magnetizes all cores *except* that for the wanted core in one sense, so that the wanted core can act as a transformer for pulse T applied in opposite sense over wire S to all cores. In fact, pulses in one sense are induced into the output wires for the "wanted" code and pulses of the other sense in the other output wires. The output circuits are therefore made responsive only to pulses in the first mentioned sense.

Each core has an additional winding W, which (as indicated by the double lines in FIG. 2) is a plural-turn winding, and which are short-circuited via suitably-poled diodes D1, D2, D3. These short-circuited windings serve to disable the outputs due to cores other than that for the code being dealt with. The plural turn windings minimize the voltage which the diodes have to be able to withstand. These windings do not disable pulses in the wanted or "1" sense for the code for the selceted core due to the sense of the diodes.

It is possible for translators such as described above, whether using the two or one-pulse cycle to have two or more sets of input windings arranged in accordance with different codes, and/or two or more sets of output windings arranged in accordance with different codes.

In one example (not shown) in which there are ten cores for the ten decimal digit values the input windings are arranged on a 2-out-of-5 basis without complementary windings, and four sets of output wires are provided. One of these includes ten wires, the "code output" being a one-out-of-ten output, the second has four wires to give a binary output, the third has five wires to give a different two-out-of-five code output, and the fourth has seven wires to a biquinary output. Any one or more of the sets of output wires as need can be in use.

Another translator using the two pulse cycle and with 10 cores had a "one-out-of-ten" output and sets of input wires for two different two-out-of-five code inputs, binary code input on a complementary basis, and wires arranged for a biquinary code input. Any one of these input sets can be used to give a translation.

Figure 3:
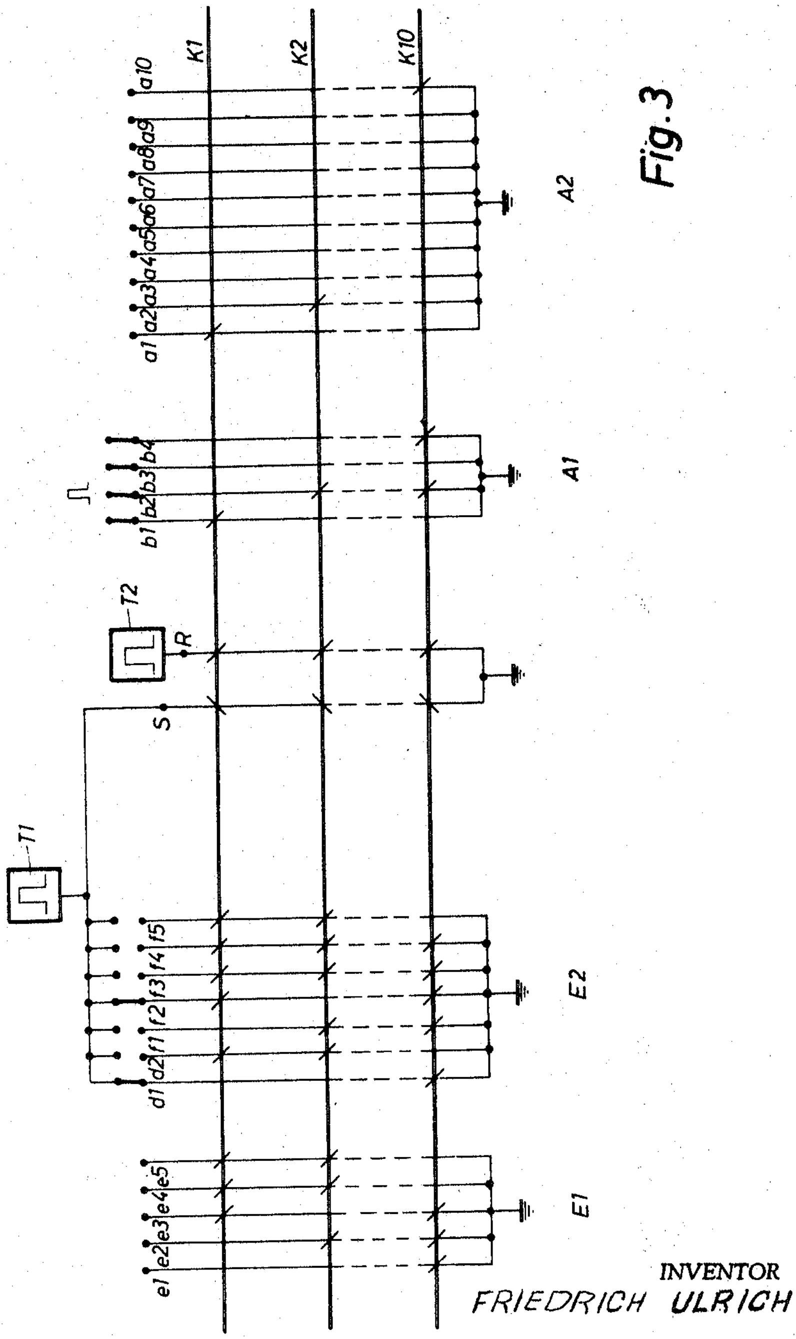
FIG. 3 is a translator in which there are a plurality of sets of input wires and also a plurality of sets of output wires, so that different translation possibilities exist.

The arrangement of FIG. 3 has inputs for a two-out-of-five code and biquinary code, either of which can be used as needed, and of which the biquinary code input is shown as being in use. It also has two sets of outputs, one for binary code and one for "one-out-of-ten," either or both of which can be in use, the binary being shown as used.

The use of two or more sets of input and/or output wires is, of course, possible with any of the arrangements herein described with reference to FIGS. 1 and 2.

Figure 4:
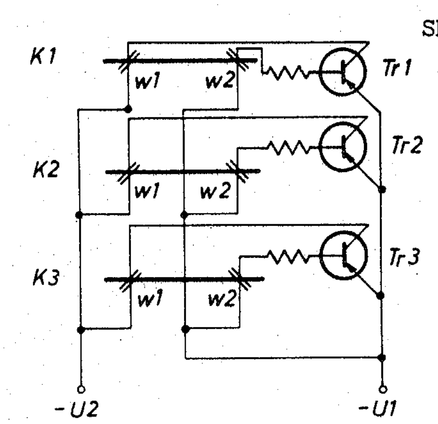
FIG. 4 shows a blocking oscillator arrangement for enhancing the amplitude of the output pulses derived from the translator when in use.

To enhance the amplitude of the output signal, the magnetic cores are designed as blocking oscillators, as in FIG. 4. These cores each have paired output windings *w*1, *w*2, each of which is a plural-turn winding as shown by the double oblique lines. These windings, with the respective transistors T*r*1, T*r*2, T*r*3, form conventional blocking oscillators.

The windings are so orientated that the change of condition of a selected core energizes that core's transistor so that the blocking oscillator functions. The voltage fed back into a selected core in this way favors its change of state from 0 to 1, so that the voltages induced in the core's output windings are increased considerably in amplitude. Voltages induced in the windings *w*1, *w*2 on non-selected cores disable the respective blocking oscillator. The power which can thus be applied to the outputs greatly exceeds that available from the control inputs: this would be very useful in a translator wherein two or more sets of output wires are in use at once; this could arise in a telephone exchange where a translation from a wanted line's directory number could give that line's equipment number, its class of line, and the meter fee appropriate thereto.

Figure 5:
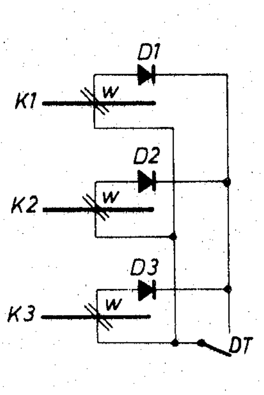
FIGS. 5, 6 and 7 show various shunt circuits for suppressing interference pulses or other unwanted outputs in a manner similar to that described with reference to FIG. 2.
Figure 6:
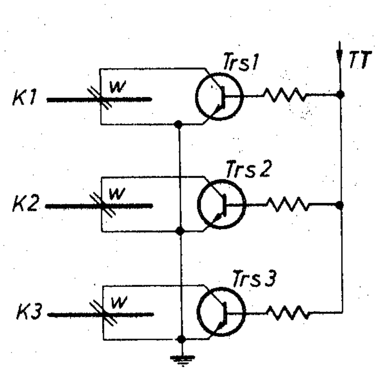
Figure 7:
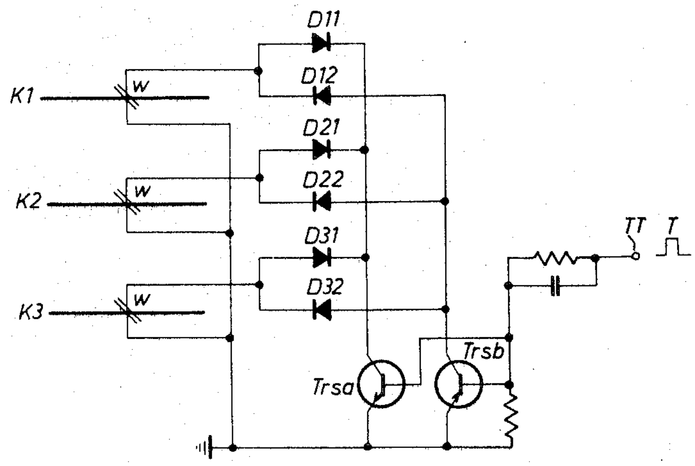

FIGS. 5–7 show different versions of the short circuited winding used in FIG. 2 to disable pulses due to unselected cores. In FIG. 5 all short circuits are normally disabled, being enabled by closing contact DT, which is closed (preferably electronically) while pulse T (FIG. 2) is present. FIG. 6 is similar but the control uses the emitter-collector path of transistors. This, of course, avoids the use of the diodes of FIGS. 2 and 5. A pulse on lead TT during time T switches all transistors on to enable these short circuits.

In FIG. 7 there are two control circuits, one to suppress pulses of one sense and one for the other, the two being base controlled from TT (pulse T, FIG. 2) together. Here there are two transistors, one pnp and one npn, one per control circuit. When the pulse is applied via the base C-R circuit, its leading edge enables transistor T*rsa* to render one circuit effective while the trailing edge enables transistor T*rsb* to render the other effective. This suppresses interference signals during core changeover.

Figure 8:
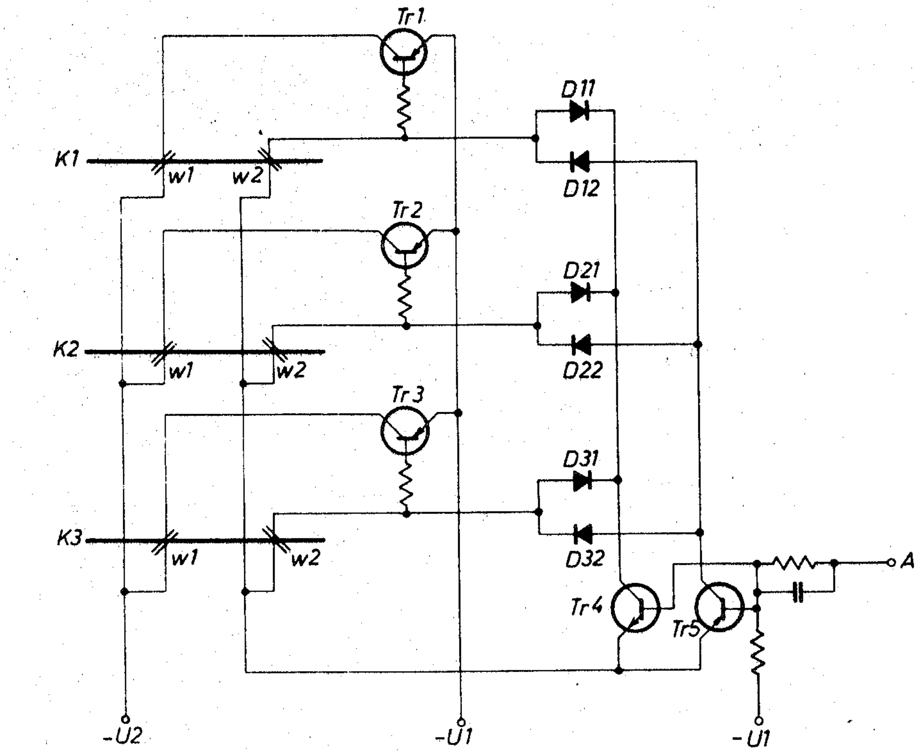
FIG. 8 is a circuit combining the function of shunt circuit and blocking oscillator.

FIG. 8, derived from FIG. 4, is an arrangement in which there is a separate control circuit to suppress interfering signals on the output lead. When the control pulse induced into a W2 winding is negative, the appropriate blocking oscillator is released while if it is positive the oscillator is blocked. However, interfering pulses will still find their way to the output wires. Assuming that core K2 is the selected core, when transistor T*r*4 is rendered conductive, which occurs via its base input at T (FIG. 1), the interfering pulses are short circuited via diodes D11 and D31. Hence the interfering pulses are limited to an extent dependent on the limiting voltages of these diodes and by the number of turns of *w*2.

In the non-operative condition, T*r*5 and the diodes D12, 22, 32 disable the translator so that no output is possible, even if the interfering pulses are of the right polarity to give an output.

When T*r*5 is made conductive at or near the end of the timing pulse, this enables T*r*4 to reset the non-selected cores to 0 and to suppress the interfering signals. The control windings *w*2 then operate the blocking oscillator and also control the shunt circuits on the cores.

What is claimed is:

1. A magnetic translator for converting input codes to different output codes,
   - said translator using a maximum of two steps per translation cycle,
   - said translator comprising a plurality of cores with one core of magnetic material for each input code to be translated,
   - said cores selectively threaded by a plurality of input wires thereby determining the input code and a plurality of output wires for thereby determining the output code, a further one of sid input wires threading all of said cores, means for simultaneously applying a pulse to said plurality of said input wires to set all cores except the one core wired for the desired input code to be translated, means for simultaneously applying said pulse through the further one of said input wires, the pulse aplied to said further one of said input wires being in the opposite sense as seen by said cores to that applied via the plurality of input wires whereby pulses are induced on the output winding of the said one core for the desired code, and means for increasing the amplitude of the pulses on the one core relative to the amplitude of the induced pulses on the other cores.

2. The translator of claim 1 wherein said last name means comprises short circuit winding means threading said cores, said short circuit winding means including a unilaterally conductive device for inhibiting the induced pulses on all of said cores except on the one core.

3. The translator of claim 1 wherein said last named means comprises additional winding means threading each of said cores, said additional winding means comprising the windings of a blocking oscillator, means for actuating said blocking oscillator responsive to setting of the one core, thus increasing the relative amplitude of the output pulses therefrom.

4. A translator as claimed in claim 2, and in which each of said unilaterally conductive devices is a semiconductor diode.

5. A translator as claimed in claim 4, and means whereby the short circuits are effective in opposite sense when no effective output is needed.

6. A translator as claimed in claim 2, in which each said short circuit includes the emitter-collector path of a normally disabled transistor, means for completing the short circuit only when an effective output is needed.

7. A translator as claimed in claim 3, and each said blocking oscillator comprising a second transistor.

8. A translator as claimed in 7, including means for normally disabling said blocking oscillators, and switch means operated to enable said blocking oscillators.

9. A translator as claimed in claim 8, and in which said switch device comprises a further transistor which is normally cut off but is switched on to connect a power supply to the blocking oscillator.

10. A translator as claimed in claim 9 and in which at least two sets of input wires are provided, each of which sets relates to a different code, so that when a translation is needed it can be received in any one of two or more code forms.

11. A translator as claimed in claim 10 and in which at least two sets of output wires are provided, each relating to a different code so that a received code can be translated into any one or more of two or more code forms.

References Cited

UNITED STATES PATENTS

| | | | |
|---|---|---|---|
| 3,105,911 | 10/1963 | Lynch | 340—166 XR |
| 3,126,528 | 3/1964 | Constantine | 340—166 XR |

OTHER REFERENCES

M. Rauhe: "Coretranslator and Multiplier" I.B.M., Tech. Disclosure Bulletin, vol. 2, No. 2, August 1959 (340/166).

R. Steckenrider: "Magnetic Core Translator" I.B.M. Tec. Disclosure Bulletin, vol. 2, No. 2, August, 1959 (340/166).

DONALD J. YUSKO, *Primary Examiner.*